United States Patent [19]

Coldren

[11] Patent Number: 4,650,925
[45] Date of Patent: Mar. 17, 1987

[54] CLAMP FOR FLAT CABLE

[75] Inventor: Daniel R. Coldren, Enola, Pa.

[73] Assignee: AMP Incorporated, Harrisburg, Pa.

[21] Appl. No.: 723,226

[22] Filed: Apr. 15, 1985

[51] Int. Cl.⁴ .............................................. H01B 7/00
[52] U.S. Cl. ................................ 174/135; 174/71 R;
24/543; 24/487; 24/16 PB; 339/17 F
[58] Field of Search ................ 24/559, 560, 561, 564,
24/305 P, 487, 543, 555, 544, 556, 16 PB;
339/17 F, 17 L; 174/135, 71 R

[56] References Cited

U.S. PATENT DOCUMENTS

| | | | |
|---|---|---|---|
| 3,739,525 | 6/1973 | Rybak | 24/487 X |
| 3,809,371 | 5/1974 | Martini | 24/543 X |
| 3,906,592 | 9/1975 | Sakasegawa et al. | 24/543 X |
| 4,065,199 | 12/1977 | Andre et al. | 339/17 F |
| 4,192,965 | 3/1980 | Baum | 174/135 |
| 4,194,274 | 3/1980 | Garrison | 24/559 X |
| 4,356,599 | 11/1982 | Larson et al. | 24/487 X |
| 4,380,103 | 4/1983 | McGrath et al. | 24/543 |
| 4,406,916 | 9/1983 | Southerland | 174/135 |

FOREIGN PATENT DOCUMENTS

| | | | |
|---|---|---|---|
| 822989 | 11/1951 | Fed. Rep. of Germany | 24/543 |
| 2640233 | 3/1978 | Fed. Rep. of Germany | 339/17 L |
| 6702594 | 8/1967 | Netherlands | 24/543 |

OTHER PUBLICATIONS

IBM Technical Disclosure Bulletin, Knight et al., vol. 25, No. 1, Jun. 1982.

Primary Examiner—Peter A. Aschenbrenner
Assistant Examiner—Laurie K. Cranmer
Attorney, Agent, or Firm—Robert W. J. Usher

[57] ABSTRACT

A one-piece clamp (11) for clamping a flat cable (33) in folded condition is of clamshell construction, one of the half shells (13) comprising a hemicylindrical cable fold locating portion (26) joined to a radially extending cable gripping part (27) so that, when latched together, the half shells (12, 13) define an eccentric cable receiving opening. A portion of flat cable (33) folded across itself along an oblique fold line is retained in folded condition predominantly by clamping pressure applied by the cable gripping part (27) to a longitudinal edge portion of the cable (33) remote from the fold line.

4 Claims, 3 Drawing Figures

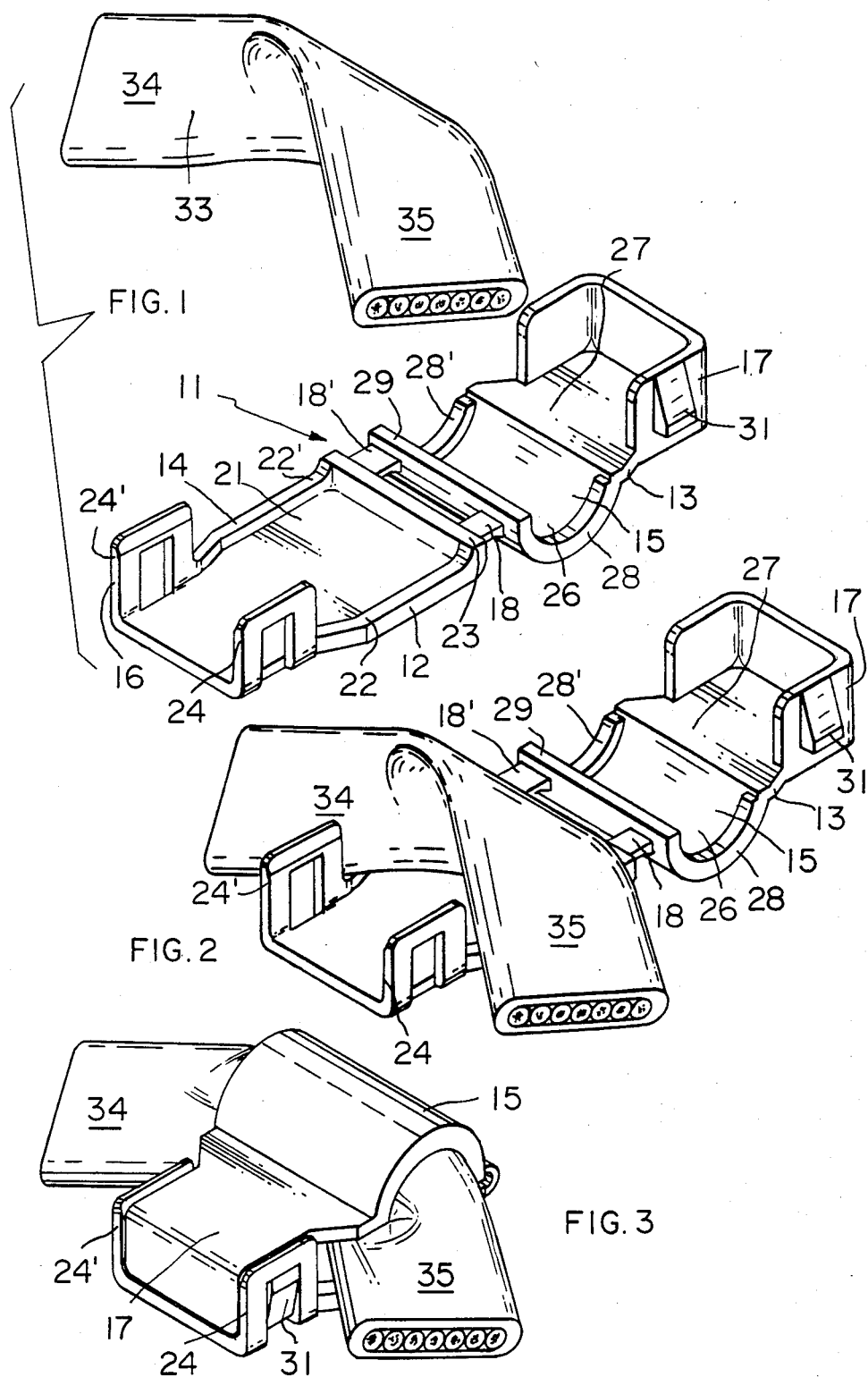

CLAMP FOR FLAT CABLE

The invention relates to a cable clamp for flat cable.

Flat cable is commonly used both within electronic equipment to link sections together and externally to link individual modules together. In the interest of compactness and to avoid risk of cable snagging, where the cable is to be routed in a different direction, it is desirable to route the flat cable by folding the cable across itself along an oblique fold line so that portions of the cable may extend from each side of the fold in substantially coplanar relation.

However, it is difficult to clamp the cable in folded condition in view both of the inherent cable stiffness producing a bulky fold and a need to avoid imposing excessive stress on the cable along the fold line which may cause plastics flow and deterioration of the cable over a period of time.

It is also important that the cable clamp be both economic to produce and easy to apply to the cable.

According to the invention, a one-piece clamp for flat cable comprising first and second half shells integrally joined together at one of their ends by a web hinge and having interengageable latching means at their other ends to latch the shells together in a clamping condition, one of the half shells having a concave cable fold locating portion joined to a radially extending portion so that, when in cable clamping condition, the half shells define between them a cable receiving sleeve of eccentric cross-section with a wide cable fold locating portion and a narrow cable gripping portion, whereby a portion of a flat cable folded across itself along an oblique fold line is retained in folded condition in the sleeve predominantly by clamping pressure applied by the cable gripping portion to a longitudinal edge portion of the cable remote from the fold line.

Application of clamping pressure to the cable at locations spaced from the fold line prevents excessive stress being imposed on the cable, while application of the cable clamp to the folded cable is relatively simple requiring merely closing the half shells together in one bond.

More specifically, the cable gripping portion is defined by relatively flat portions of the half shells.

Desirably, the cable gripping portion is adjacent the latching means and the cable fold locating portion is adjacent the web image. This avoids excessive stress being imposed on the web hinge which is usually relatively fragile readily to obtain pivotal movement.

An example of a cable clamp according to the invention will now be described with reference to the accompanying drawings in which:

FIG. 1 is a perspective view of the clamp in a cable receiving condition and aligned with a suitably folded flat cable;

FIG. 2 is a similar view of FIG. 1 with the folded cable located in a first half shell of the clamp; and, FIG. 3 is a similar view to FIG. 1 with the clamp in the cable clamping condition.

The cable clamp 11 is of generally clamshell construction comprising first and second half shells 12 and 13, respectively, consisting of latching portions and cable clamping portions 14, 15 and 16, 17, respectively, integrally joined together at adjacent ends by a pair of web hinges 18, 18.

The cable clamping portion 14 of the first half shell 12 is a relatively shallow shallow dish having a flat base wall 21 upstanding from opposite sides and one end of which are strengthening flanges 22, 22' and 23, respectively, the flange 23 being of greater height than flanges 22, 22'. The flanges converge towards and are coextensive with a pair of resilient hasps or eyes 24, 24' of the latching portion 15, which upstand in opposed relation adjacent the other end of the cable clamping portion 16.

The cable clamping portion 15 of the second half shell 13 has a cable locating part 26 of generally hemicylindrical shape, a longitudinal edge of which communicates with a flat, radially extending cable gripping part 27.

Strengthening flanges 28, 28' and 29 extend around axial ends and the other longitudinal edges of the part 26, respectively. The latching portion 17 of the second half shell 13 is of three sided box construction opening towards the cable clamping portion, opposite sides carrying latching detects 31, 31' for receipt in the hasps 24, 24' respectively, to latch the half shells 12, 13 together in the cable clamping condition.

A flat cable 33 having opposite surfaces 34 and 35 is routed by bending the cable across itself along a fold line extending obliquely of the cable axis so that the surfaces 34 and 35 face in the same direction on respective axial sides of the fold and locating the folded portion in the cable clamping portion 14 of the first half shell as shown in FIG. 2. The half shells 12 and 13 are then closed together defining an eccentric sleeve clamping the cable in folded condition with detents 13 being received in eyes 24 as shown in FIG. 3. As a result of the stiffness of the cable, the fold is substantially thicker than twice the cable thickness. The hemicylindrical portion accommodates the fold without imposing excessive stress on the cable while a high proportion of the clamping pressure is imposed by engagement of a portion of the cable gripping part 27 with an edge portion of cable surface 35 remote from the fold.

Thus, the clamping force is distributed to retain cable stress at an acceptable level which avoids deterioration of the cable over a period of time while the shape of the cable clamp also prevents rotation of the cable.

I claim:

1. A clamp and flat electrical cable assembly, the clamp being mounted in one piece of plastics material and comprising first and second half shells integrally joined together at one of their ends by a web hinge and having latching means at their other ends interengaged to latch the shells together in a clamping condition, one of the half shells having a cable fold locating portion with a concave cable engaging surface joined to a radially extending portion so that the half shells define between them a cable receiving sleeve of eccentric cross section with a wide cable fold location portion communicating with a narrow cable gripping portion adjacent the latching means, and a portion of a flat cable folded across itself along an oblique fold line retained in folded condition in the sleeve predominantly by clamping pressure applied by the cable gripping portion to a longitudinal edge portion of the cable remote from the fold line.

2. An assembly according to claim 1, in which the cable gripping portion is defined by relatively flat portions of the half shells.

3. An assembly according to claim 2 in which the latching means comprises a pair of resilient latching eyes located in opposed relation on the first half shell and a pair of latching projections located on opposite side walls of the second half shell, such side walls being received between the eyes when the latching projections are engaged therewith in the clamping condition.

4. A clamp and flat electrical cable assembly which clamp is moulded in one piece from plastics material and comprises first and second half shells integrally joined together at one of their ends by a web hinge and having interengaged latching means at their other ends latching the shells together in clamping condition, the first half shell having, adjacent the web hinge, a cable fold locating portion with a concave cable engaging surface joined along a longitudinal edge to a relatively flat, radially extending cable gripping part adjacent the latching means, the second half shell comprising a relatively flat, shallow dish so that the half shells define between them a cable receiving sleeve of eccentric cross section with a wide cable fold locating portion communicating with a narrow cable gripping portion, a portion of a flat cable folded across itself along a oblique fold line being retained in folded condition in the sleeve predominantly by clamping pressure applied by the cable gripping portion to a longitudinal edge portion of the cable remote from the fold line.

* * * * *

UNITED STATES PATENT OFFICE
CERTIFICATE OF CORRECTION

Patent No. 4,650,925                Dated  March 17, 1987

Inventor(s)   Daniel R. Coldren

It is certified that error appears in the above-identified patent and that said Letters Patent are hereby corrected as shown below:

Column 2, Line 44 (line 2 of claim 1), "mounted" should read ---moulded---.

Signed and Sealed this

Twelfth Day of January, 1988

Attest:

DONALD J. QUIGG

Attesting Officer          Commissioner of Patents and Trademarks